J. S. KIERSTEAD.
NUT LOCK.
APPLICATION FILED OCT. 30, 1916.
1,235,205.
Patented July 31, 1917.
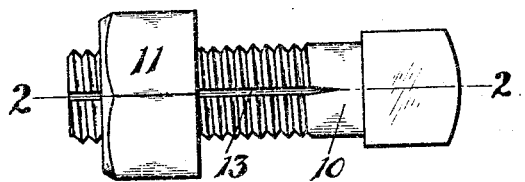
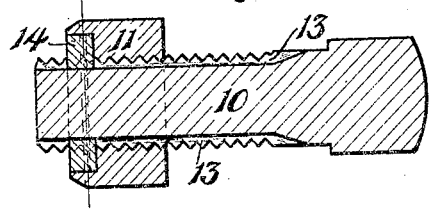
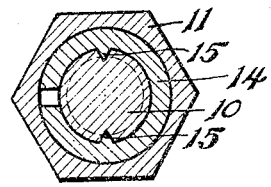
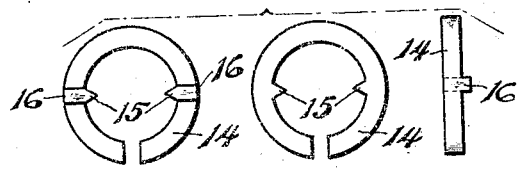
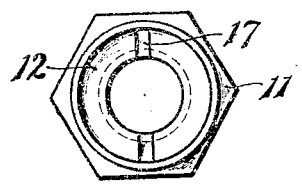
WITNESS:
Leo J. Griffin.
INVENTOR,
JAMES S. KIERSTEAD.
BY Frank H. Allen
Frederick K. Daggett.
ATTORNEYS.

UNITED STATES PATENT OFFICE.

JAMES S. KIERSTEAD, OF PLYMOUTH, MASSACHUSETTS.

NUT-LOCK.

1,235,205.　　　Specification of Letters Patent.　　Patented July 31, 1917.

Application filed October 30, 1916.　Serial No. 128,380.

*To all whom it may concern:*

Be it known that I, JAMES S. KIERSTEAD, a citizen of the United States, residing at Plymouth, in the county of Plymouth, in the State of Massachusetts, have invented a certain new and useful Improvement in Nut-Locks, of which the following is a specification, reference being had to the accompanying drawings.

This invention relates to that class of nut locks in which the nut is first screwed forcibly to its home position on the bolt and is then locked against rotation, in either direction, by means of a detachable member; the construction and operation of the said locking member being such that the threads of the nut and bolt are not jammed or otherwise mutilated.

My invention is illustrated in, and by means of, the annexed drawings, Figure 1 being a side view of an assembled bolt and nut having embodied therein locking means of my present improved construction, and Fig. 2 is a central, longitudinal, sectional view of the same taken on the line 2—2 of said Fig. 1. Fig. 3 is a transverse, sectional, view taken on the line 3—3 of Fig. 2. Fig. 4 shows views of the opposite faces and of the circumferential edge of the locking member, and Fig. 5 is an outer end view of the nut, illustrating particularly the cavity provided for the reception of the locking member, as well as depressions or notches for the reception of spurs formed on one face of the said locking member.

Referring now to these drawings, the numeral 10 indicates a threaded bolt and 11 denotes a nut which is adapted to be screwed upon the said bolt; the bolt being formed with one or more longitudinal grooves 13 which extend, by preference, to the bottom of the bolt threads.

The nut is counterbored or otherwise chambered, at its outer end, as at 12, to receive a locking member 14 which is formed as an open-sided washer whose inner face or edge is provided with one or more inwardly projecting ribs 15 which are adapted to enter the bolt grooves 13, after the manner of a spline or "feather," when the washer 14 is slipped onto the bolt. The said ribs 15 are also extended beyond the face of the washer, as at 16, thus providing spurs which will extend into notches 17 formed in the nut, at the bottom of the cavity 12.

When the locking washer 14 is located in the nut 11 the ribs 15 lie in the bolt grooves 13, and the spurs 16 lie in the nut notches 17.

The bolt, the nut, and the locking washer are assembled, and locked together as follows: The nut is first screwed home on the bolt with the grooves 13 in register with the notches 17. The washer 14 is then slipped into the nut cavity 12 and onto the bolt with the ribs 15 located in the grooves 13 and the spurs 16 located in the notches 17; the washer being thus held against rotation with respect to the nut and, in turn, preventing the rotation of the bolt because of the fact that the ribs 15 lie in the grooves 13.

The open-sided washer is slightly larger (in its outside diameter) than the circumferential wall of the nut cavity 12 and so that the washer must be compressed slightly, and sprung into the said cavity, thus preventing the accidental or unintentional escape of the washer from the cavity. The washer may, however, be removed from said cavity by slightly compressing it whenever it is desired to tighten up the nut or to unscrew it from the bolt.

The placing of the locking washer in its operative position in the nut, as described, results, in effect, in splining the nut on the bolt yet it does not mutilate the nut or bolt.

Having thus described my invention, I claim as new and wish to secure by Letters Patent:—

1. In combination, a threaded bolt formed with a longitudinal spline seat, a chambered nut on said bolt formed with a notch at the bottom of said chamber, and a split locking washer seated in said nut chamber;

said washer being formed with a rib adapted to enter the said spline seat and with a spur adapted to enter the said notch.

2. In combination, a threaded bolt having a longitudinal spline-seat, a chambered nut on said bolt, the chamber of said nut having a notch in its bottom, a split washer normally of outside greater diameter than said chamber, being compressible to enter the latter, said washer having upon its inner circumference a rib received by said spline seat of the bolt and having upon its bottom surface a spur entering said notch.

JAMES S. KIERSTEAD.

Copies of this patent may be obtained for five cents each, by addressing the "Commissioner of Patents, Washington, D. C."